United States Patent [19]

Geka

[11] Patent Number: 4,496,198

[45] Date of Patent: Jan. 29, 1985

[54] ROLLER BEARING FOR ENDLESS LINEAR MOTION

[75] Inventor: Toshiaki Geka, Funabashi, Japan

[73] Assignee: Nippon Thompson Co., Ltd., Tokyo, Japan

[21] Appl. No.: 536,373

[22] Filed: Sep. 27, 1983

[30] Foreign Application Priority Data

Dec. 2, 1982 [JP] Japan ................................ 57-211689

[51] Int. Cl.³ ............................................ F16C 29/06
[52] U.S. Cl. ................................................... 308/6 C
[58] Field of Search ...................... 308/6 C, 6 R, 6 A; 464/168

[56] References Cited

U.S. PATENT DOCUMENTS

| | | | |
|---|---|---|---|
| 4,302,059 | 11/1981 | Teramachi | 308/6 C |
| 4,352,526 | 10/1982 | Imai | 308/6 C |
| 4,396,235 | 8/1983 | Teramachi | 308/6 C |
| 4,405,185 | 9/1983 | Oetjen | 308/6 C |

*Primary Examiner*—Lenard A. Footland
*Attorney, Agent, or Firm*—L. Lawton Rogers, III

[57] ABSTRACT

A roller bearing for endless linear motion wherein a casing mounted on a track rail makes linear motion through a plurality of rollers circulating endlessly. A circulating path for the rollers is constructed by load track, return hole and direction changing path. The load track and return hole are straight, parallel to each other and approximately square shape in cross section, respectively. The center of the return hole does not lie in the horizontal bisecting plane of the right angle V groove of the load track. The return hole is symmetric to the load track with respect to the perpendicular bisector of the segment line joining the centers of the rollers in the return hole and the load track. The direction changing path is a cylindrical surface of revolution which is approximately square shape in cross section and which is formed by revolving 180° between the load track and the return hole, the axis of revolution being the perpendicular bisector of the segment line joining the centers of rollers in the return hole and the load track.

Thus the most compact roller bearing for endless linear motion having smooth motion and high strength is obtained.

7 Claims, 25 Drawing Figures

ROLLER BEARING FOR ENDLESS LINEAR MOTION

BACKGROUND OF THE INVENTION

1. Field of the Invention

The present invention relates to a roller bearing for endless linear motion in which a casing mounted on a track rail of linear shape can make an endless linear motion through a plurality of rollers circulating endlessly. It is a bearing in which cylindrically shaped rollers are used as rolling bodies which bear loads of all directions such as upward, downward, forward, rearward, rightward or leftward, as the bearing makes an endless linear motion. Moreover, the present invention aims to provide the most compact roller bearing for linear motion from the viewpoint of sectional height and width of the bearing in comparison with prior art bearing for the same load capacity.

2. Description of the Prior Art

In the prior art roller bearing for endless linear motion, for instance, as shown in FIG. 3, although casing 4 mounted on track rail 6 can make endless linear motion through a plurality of roller 7, the position of return hole, which circulates roller 7 rolling in load track 2 through direction changing path, is such that the center of the return hole lies on the bisecting plane of the right angle V groove 3 of load track 2, as shown by $1a$. If the return hole $1a$ is provided at this position, the return hole will be in a position close to a preload bolt of the preload device which preloads bearing plate 20 (FIG. 3) provided with right angle groove 3, according to the condition of use of the bearing. In such case, the preload device can be placed only at a position out of a circulating path consisting of load track 2, return hole $1a$, and the direction changing paths at both ends, namely, only at two places, or, at front and rear ends in the direction of the linear motion and a wedge device may be used in combination. As a result, proper preload cannot be imposed throughout the length of the load track causing insufficient functioning of the preload device. Thus not only the width of the casing 4 is increased but the length is increased for an amount necessary to install the preload device, and the compactness of the bearing is prevented.

Also, FIGS. 24 and 25 show an arrangement of U.S. patent application Ser. No. 499,367 filed on May 31, 1983 by the present applicant. In this arrangement, the direction change of rollers 42 is made from load track 43 to upwardly inclined return hole 44 through direction changing path 48 that is formed in a circular arc shape both for its horizontal and vertical projections. In comparison with prior art, this arrangement allowed a plurality of preload bolts 47 to be provided at positions approximately close to the bisecting plane of right angle V groove 45 of load track 43 and at positions close to return hole 44. Thus, it was possible to achieve a compact bearing. However, since the return hole 44 is provided at A portion shown in FIG. 3, there is a tendency to decrease the strength near A portion of casing 4. For this reason, it is necessary to increase the width b of a depending portion 5 of the casing 4 (shown in FIG. 3) where the preload device is installed. Also the height of the casing which is mounted on track rail 40 has to be increased for an amount corresponding to the upwardly inclined return hole. Thus, although compactness was induced in comparison with the prior art described previously, there was still a limitation in compactness. The spacially curved shape of the direction changing path was also complicated, and thus the processing of the direction changing path was difficult.

Further, in case a roller bearing for linear motion is used on machine tools, etc., ball threads, fluid cylinders, etc. for driving purpose are often installed in-between load tracks at both sides. In such cases, it is desired that inner width $B_1$ of the casing shown in FIGS. 1 and 26 be made large. But the width of the bearing affects the overall width of the apparatus, and if the outer width $B_2$ of the casing shown in FIGS. 1 and 26 is increased, the required installation area of the bearing will become large, and thus there was a strong demand that the width $(B_2-B_1)/2$, which is a depending portion of the casing, be made as small as possible.

SUMMARY OF THE INVENTION

The present invention comprises a roller bearing for endless linear motion wherein a casing mounted on a track rail of linear shape can perform endless linear motion through a plurality of rollers which circulate endlessly, and is characterized in that a circulating path of the rollers comprise, two linear ways including a load track made of right angle V grooves formed on a side surface of said track rail and an inner side surface of casing opposing said side surface of said track rail and a return hole which is parallel to said load track and which does not have its center on the bisecting plane of the V groove of said load track, and a direction changing path which is of a circular arc joining both ends of said two linear ways and allowing smooth direction change motion of the rollers, the section of said return hole in a place perpendicular to the direction of bearing linear motion is approximately square shape, and is symmetric to the load track with respect to the perpendicular bisector of a segment line joining the centers of the rollers rolling in said return hole and load track, and said direction changing path is a cylindrical surface of revolution which is approximately square shape in section and which is formed by revolving 180° between said load track and return hole with said perpendicular bisector being the axis of revolution. The above described construction has overcome previously described various elements which prevented compactness and easy processing.

BRIEF DESCRIPTION OF THE ACCOMPANYING DRAWINGS

These and other features and advantages of this invention will become apparent from the following detailed descriptions given by way of its preferred embodiments referring to the accompanying drawings, wherein FIG. 1 is a front view of a first embodiment of the present invention, the right half being shown by a section taken along line I—I of FIG. 2;

Figure 8:
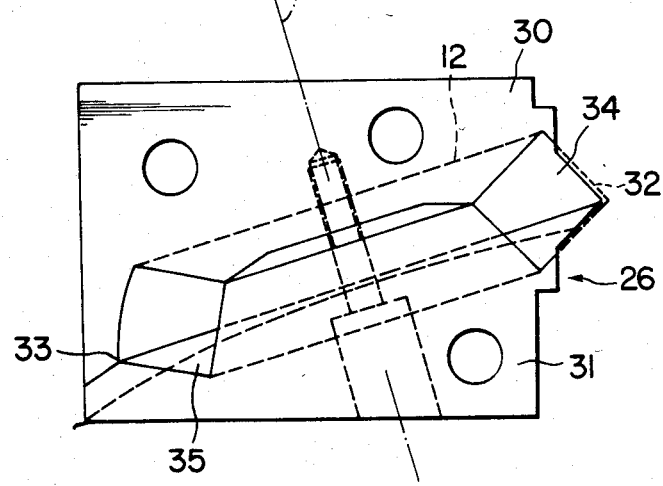
Figure 9:
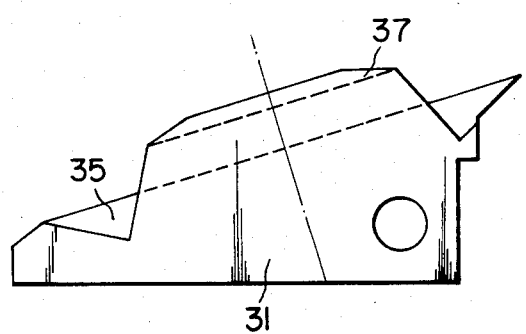
Figure 10:
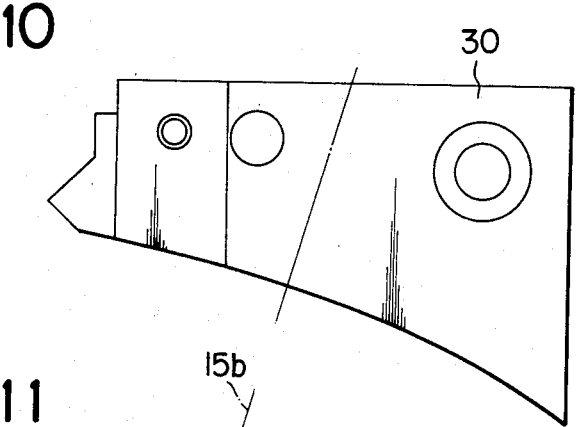
Figure 11:
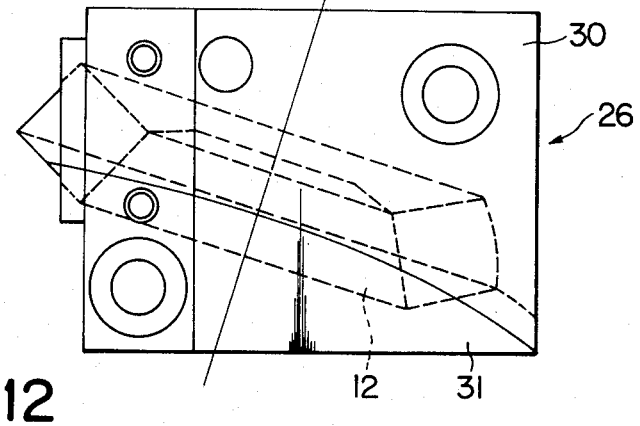
Figure 12:
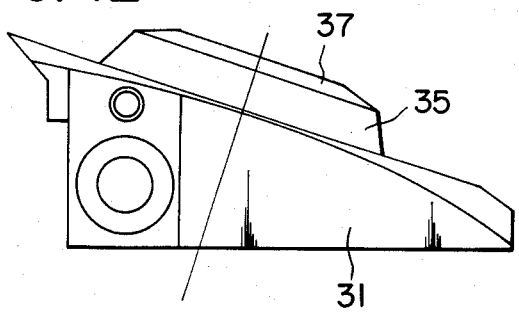
Figure 13:
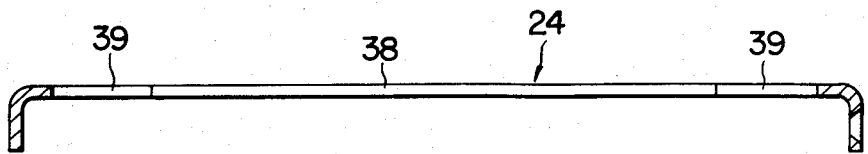
Figure 14:
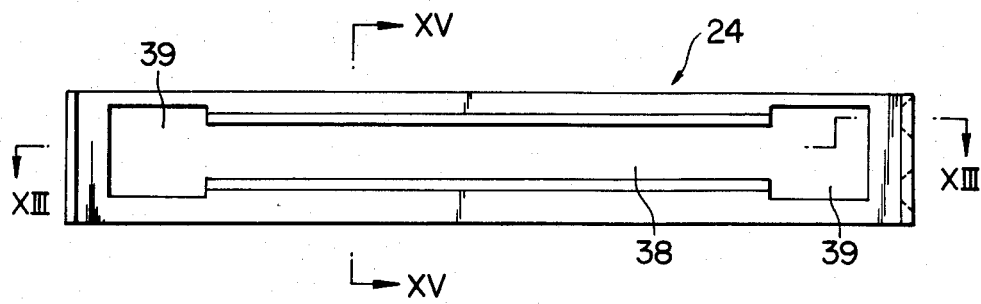
Figure 15:
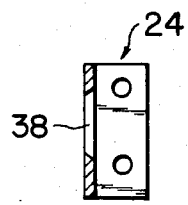
Figure 16:
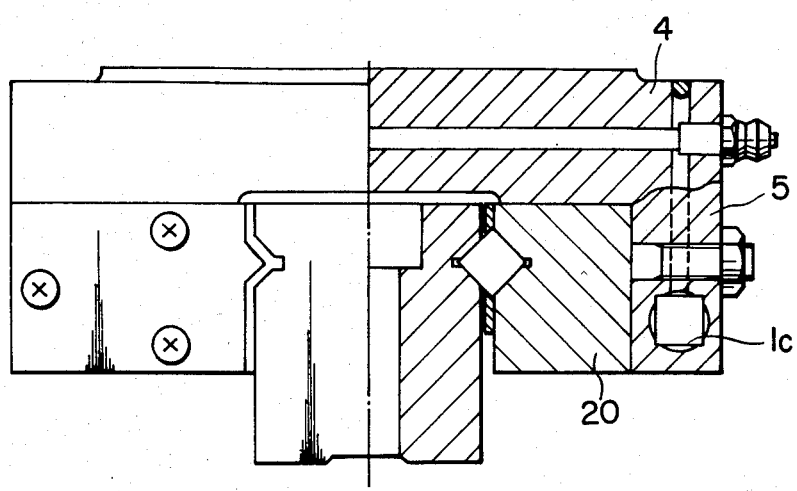
Figure 17:
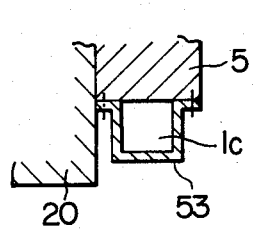
Figure 18:
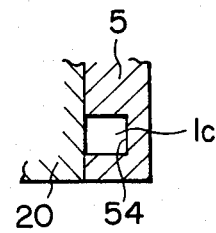
Figure 19:
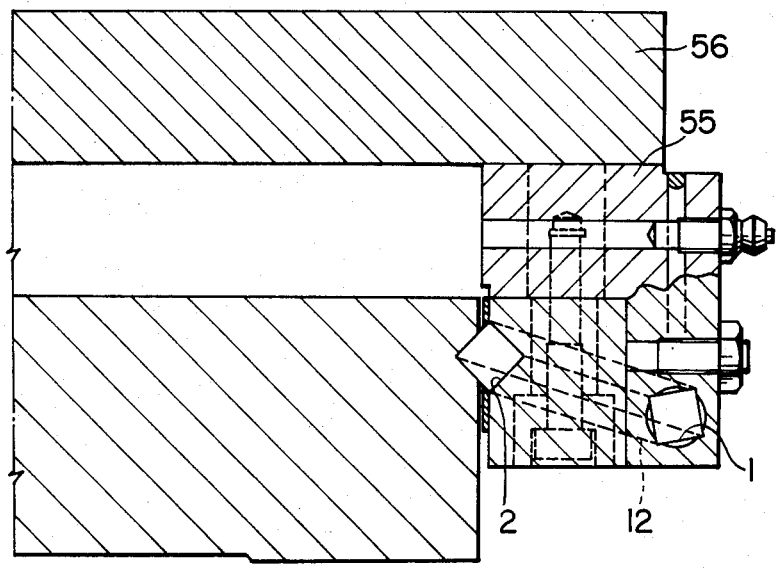
Figure 20:
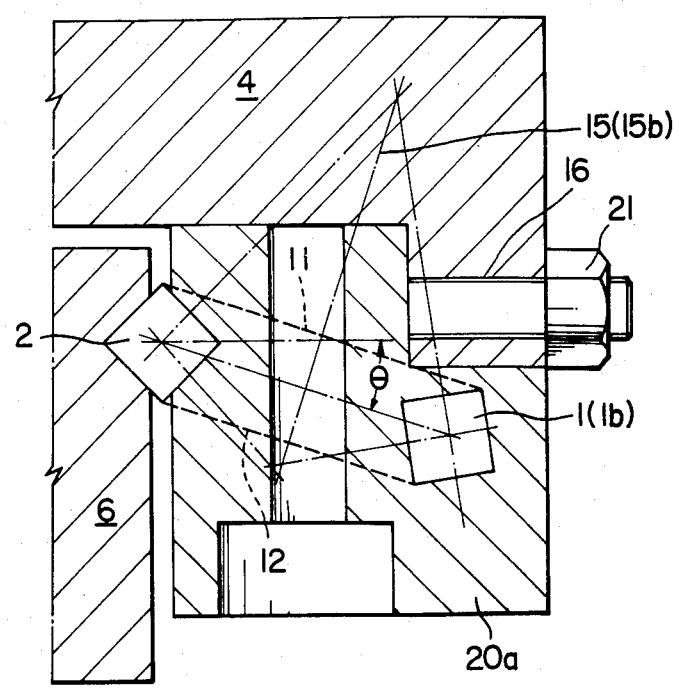
Figure 21:
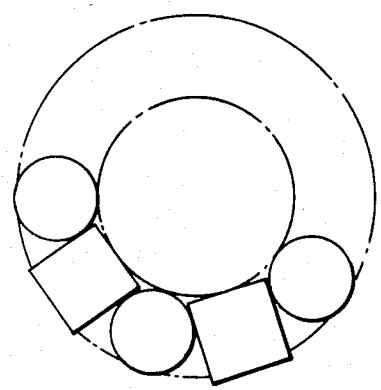
Figure 22:
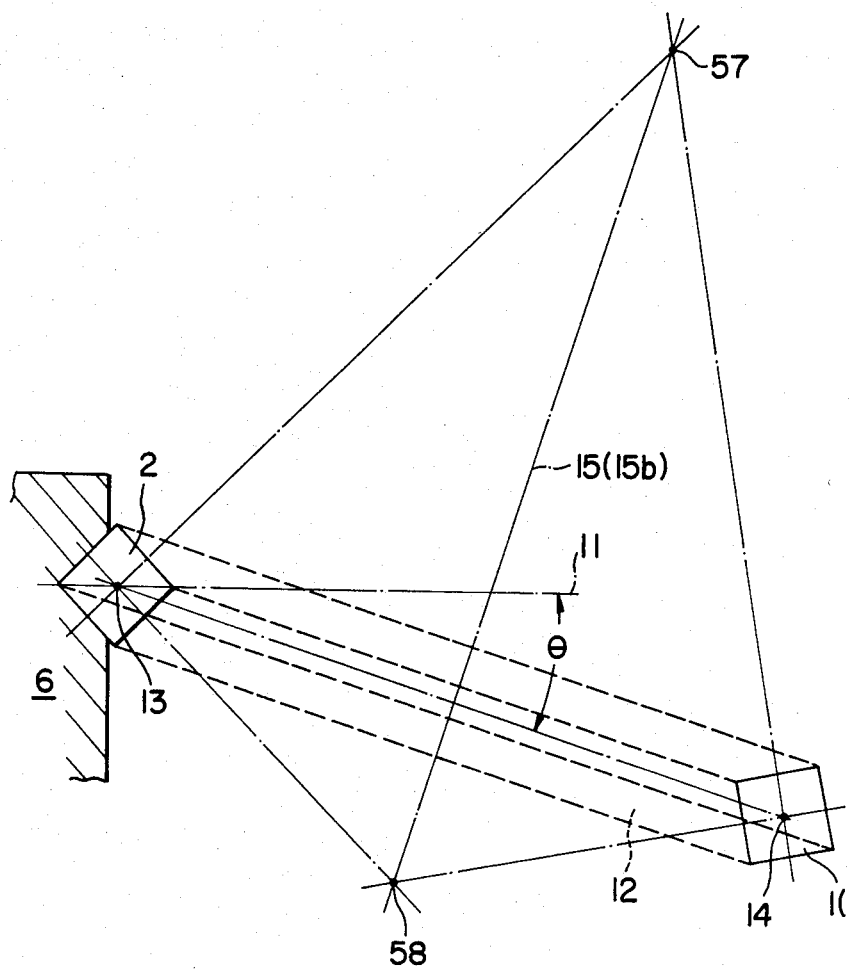
Figure 23:
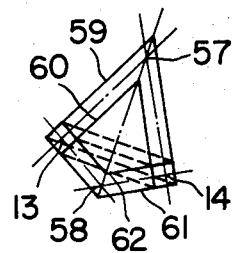
Figure 24:
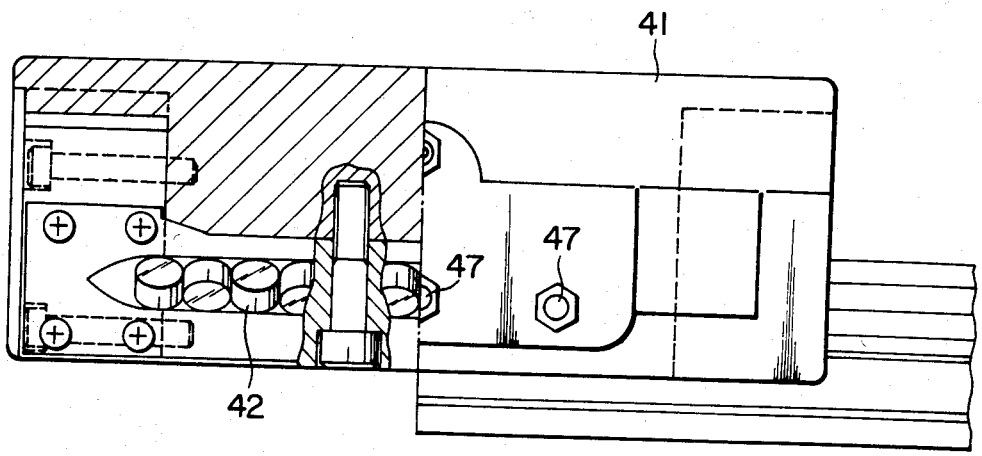
Figure 25:
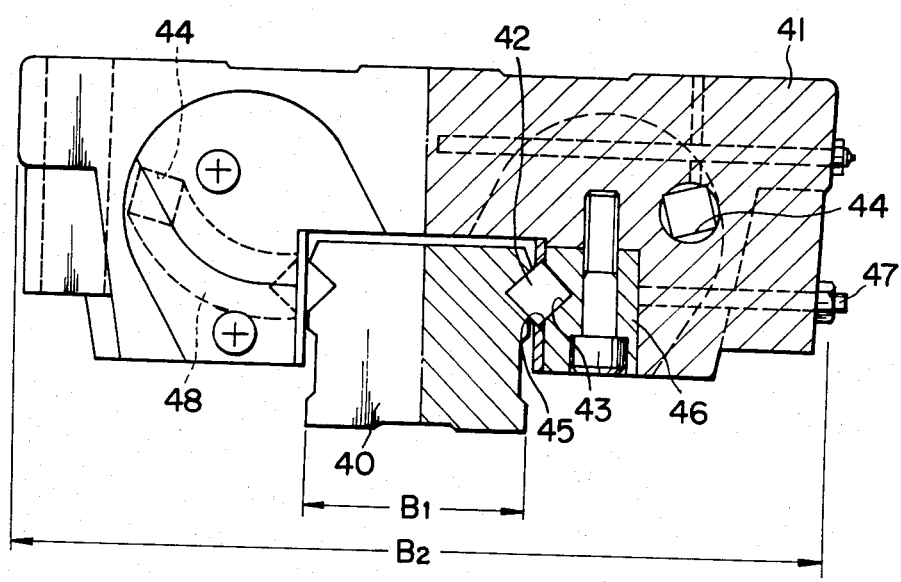

FIG. 8 is an inner front view of side plate;
FIG. 9 is an inner front view of lower side plate;
FIG. 10 is an outer front view of upper side plate;
FIG. 11 is an outer front view of side plate;
FIG. 12 is an outer front view of lower side plate;
FIG. 13 is a sectional view taken along line XIII—XIII of FIG. 14;
FIG. 14 is a side view of retainer;
FIG. 15 is a sectional view taken along line XV—XV of FIG. 14;
FIG. 16 is a front view of a second embodiment of the present invention, the right half being shown by a section similar to FIG. 1;
FIGS. 17 and 18 are sectional views showing respectively other embodiments of return hole shown in FIG. 16;
FIG. 19 is a partially sectioned view of a third embodiment of the present invention;
FIG. 20 is a partially sectioned view showing another embodiment of return hole;
FIG. 21 is a perspective view of the rollers in the direction changing path as seen from the vertex of a cone of said axis;
FIG. 22 is a partially sectioned front view showing the relationship of a circulating path;
FIG. 23 is an illustrative drawing showing the relationship of a circulating path;
FIG. 24 is a side view of prior art example, the left half being shown by a section; and
FIG. 25 is the front view of above, the right half being shown by a section.

DETAILED DESCRIPTION OF THE EMBODIMENTS

Figure 1:
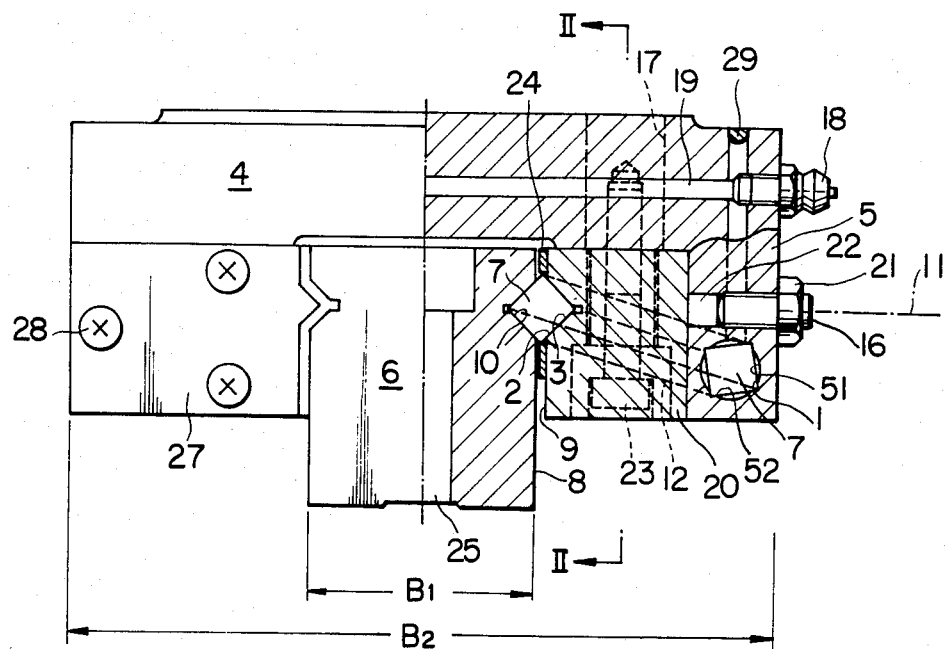
Figure 2:
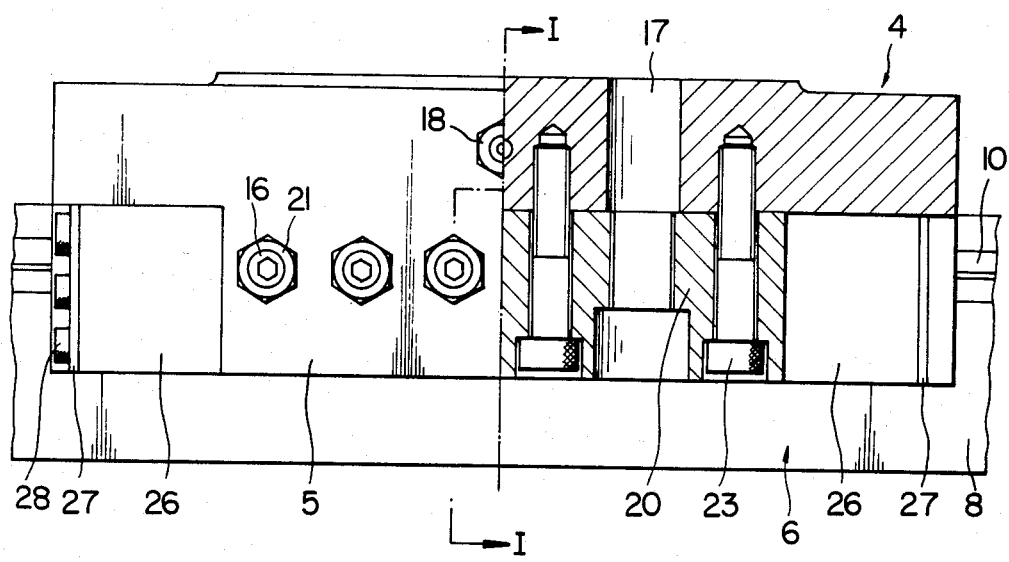
FIG. 2 is a side view of FIG. 1, the right half of casing being shown by a section taken along line II—II of FIG. 1.

As shown in FIGS. 1 and 2, there is provided a roller bearing for endless linear motion, wherein a casing 4 mounted on a track rail 6 of linear shape can make an endless linear motion in the longitudinal direction of track rail 6 through a plurality of rollers endlessly circulating, and wherein a circulating path of rollers 7 consists of a load track 2 of linear way constructed by right angle V grooves 10 and 3 formed respectively in outer surface 8 of said track rail 6 and inner surface 9 of said casing 4 opposing said outer surface 8, a return hole 1 of linear way that is parallel to said load track 2 and that does have its center on the bisecting place (plane 11 shown in FIG. 3) of right angle V groove 3 of said load track 2, and a direction changing path 12 of circularly curved shape connecting both ends of two linear ways of said load track 2 and return hole 1 at both ends of said casing 4 in the forward and rearward directions for allowing smooth direction changing motion of roller 7.

Figure 3:
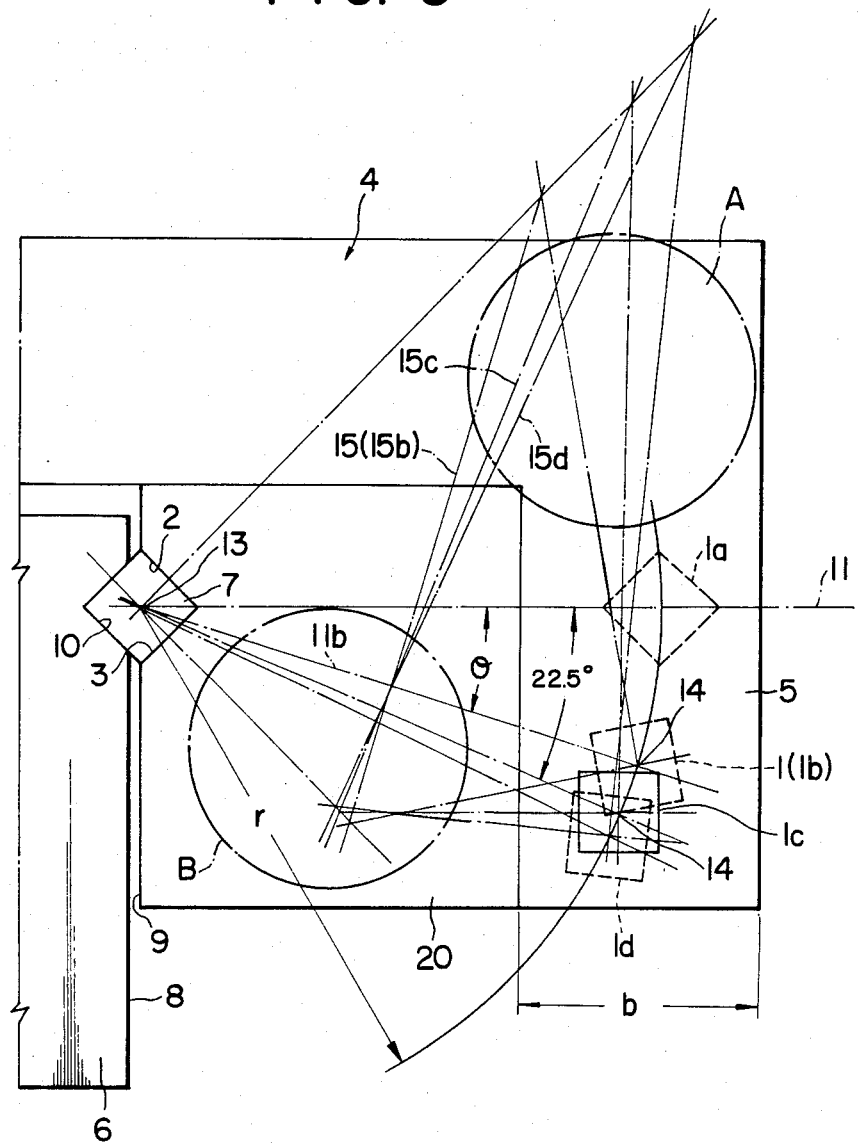
FIG. 3 is an illustrative drawing showing the relationship between load track and return hole.

As shown in FIG. 3, the sectional shape of said return hole 1 in a plane perpendicular to the direction of linear motion of casing 4 is approximately a square shape and is symmetric to the load track with respect to the perpendicular bisector of the segment line joining the center of roller 7 rolling in said load track and the center of roller 7 rolling in return hole 1.

Further, since the return hole 1 is in a no load zone, it is not necessary for the roller 7 to be in contact with the return hole completely throughout. Thus, as shown in FIG. 1, after drilling a preparation hole 51, by forming four shallow corner grooves 52, which constitute the four corners of a square section sufficient to guide the end faces of roller 7, machining operation can be made at low cost and simply.

Said direction changing path 12 is also in a no load zone similar to the return hole 1, and is formed by revolving 180° between the load track 2 and the return hole 1 with said perpendicular bisector being the axis of revolution, and said direction changing path is a cylindrical surface of revolution having a section of approximately square shape so as to allow smooth rolling of the roller 7 between said load track 2 and return hole 1.

The position and attitude of said return hole 1 can be obtained as follows.

As shown in FIG. 3, roller center 13 of roller 7 rolling in load track 2 lies on a bisecting plane 11 of right angle grooves 3 and 10. It is assumed that return hole 1, for endless circulation of the roller 7 rolling in said load track 2, is provided at a position where roller center 14 in said return hole 1 has an angle $\theta$ below the bisecting plane 11.

A circulating path is formed in which the center of roller 7 makes endless circulation with its center being positioned on plane 11b which is parallel to the direction of linear motion of the bearing and including roller center 14 at said return hole 1 and roller center 13 at said load track 2, and which makes an angle $\theta$ with said bisecting plane 11. If 15b is the perpendicular bisector of segment line joining said roller centers 13, 14, the return hole 1 has a shape symmetric to the load track 2 with respect to said perpendicular bisector 15b. The roller 7 rolling between said load track 2 and said return hole 1 circulates drawing curves parallel to said plane 11b. Said curves represent the locus of the roller 7 rolling between load track 2 and return hole 1. This locus becomes the direction changing path 12 such as shown in FIG. 1. In order for the roller to roll smoothly at the shortest path between load track 2 and return hole 1, it is sufficient that the direction changing path 12 be a semicircular shape. The diameter of this least required semicircular shape is, as shown in FIG. 3, the distance r between roller center 13 of the load track and roller center 14 of the return line. Therefore, in order to obtain return hole 1 at a position differing said angle $\theta$, a circular arc of radius r is drawn with the center at said roller center 13, and the center of the return hole is obtained on said circular arc. Return hole positions having different $\theta$ can be obtained as 1a, 1b, 1c and 1d as shown in FIG. 3. 1b is symmetric to load track 2 with respect to the perpendicular bisector 15b, and 1c and 1d are symmetric to load track 2 with respect to the perpendicular bisectors 15c and 15d, respectively.

When said $\theta$ is increased, the position of the return hole 1 will be further lowered from load track 2, and the projection of the return hole 1 on said bisecting plane 11 (normally, is a horizontal plane) will become closer to load track 2. Therefore, the required conditions for obtaining a more compact unit as a bearing will be as follows.

(1) Take said angle $\theta$ of the return hole small to the extent that there will be no interference with preload bolt 16 which is a preload device installed with its center located near the bisecting plane 11.

(2) Take the center distance r between the load track 2 and return hole 1 small so far as a smooth rolling of the roller 7 can be made from load track 2 to return hole 1.

(3) As for the motion of roller 7 from load track 2 to return hole 1, produce a smoother motion by moving along direction changing path 12 which is a cylindrical surface of revolution joining load track 2 and return hole 1.

Also, as shown in FIGS. 1 and 2, there are provided, casing mounting hole 17 for installing mounting bolt for securing casing 4 onto a machine, grease nipple 18 and grease hole 19 for supplying grease to return holes at both sides, bearing plate 20 having right angle V groove and being separate from casing 4, preload bolt 16 for imposing preload on said bearing plate 20, lock nut 21 for said preload bolt, cylindrical body for transmitting preload of said preload bolt 16 onto said bearing plate 20, bearing plate fastening screw for securing said bearing plate 20 onto casing 4, retainer 24 for preventing dropping of the rollers 7 in load track 2 when casing 4 is removed from track rail 6, track rail fastening bolt hole 25 for inserting fastening bolt to secure track rail onto a machine body, side plate 26 in which said direction changing path is provided, seal 27 to be installed at the outer end of said side plate 26, fastening screws for securing said seal 27 and side plate 26 onto casing 4, and plug 29 for grease hole 19.

Said angle $\theta$ can be selected optionally according to type, size, etc. of the bearing. However, ordinarily, by setting the angle in the range of 10°–30°, the overall bearing size can be made most compact.

Figure 4:
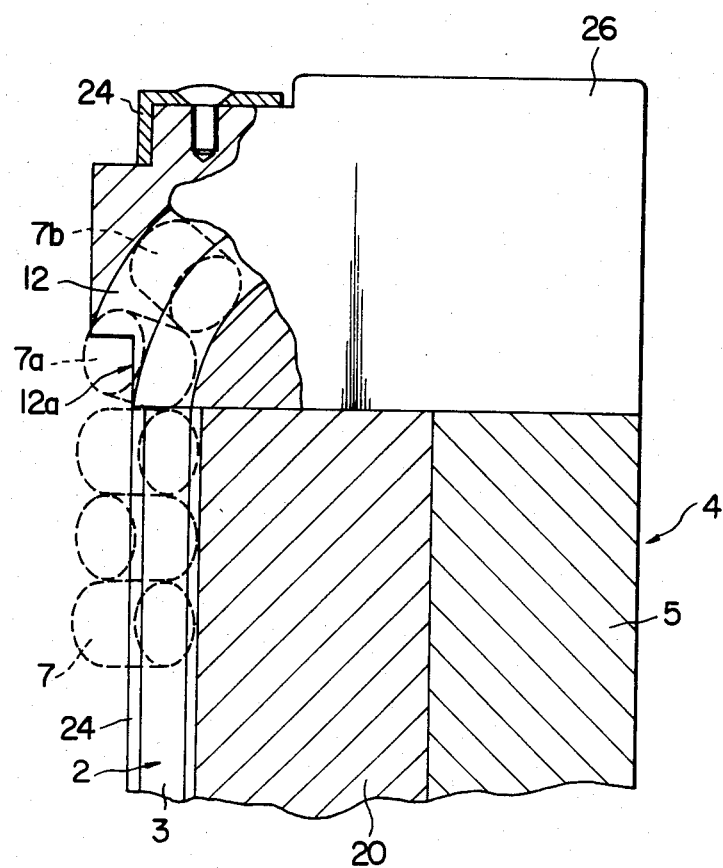
FIG. 4 is a partially horizontally sectioned view along the bisecting plane of right angle V groove with a portion of side plate removed.
Figure 5:
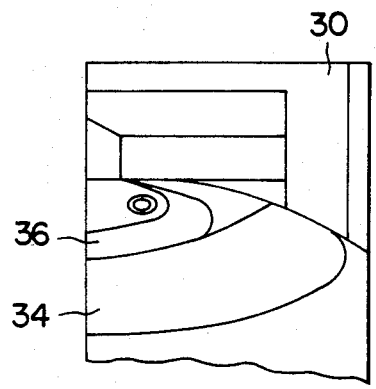
FIG. 5 is a side view of upper side plate.
Figure 6:
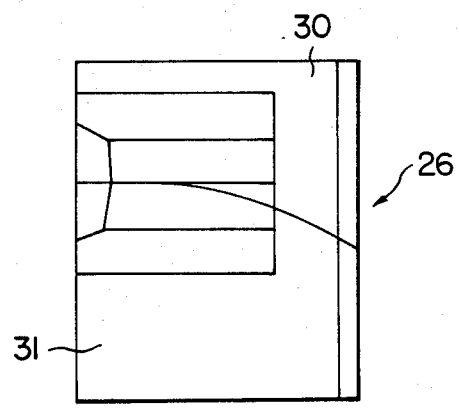
FIG. 6 is a side view of side plate.
Figure 7:
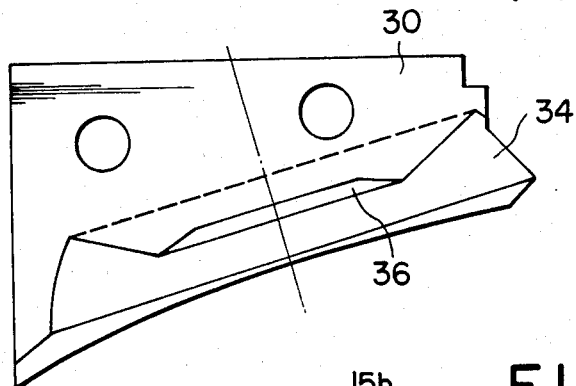
FIG. 7 is an inner front view of upper side plate.

In FIG. 4, there is shown an arrangement whereby the roller 7 moves from load track 2 into direction changing path 12 which is a no load zone. The rollers 7 in the load track 2 are held so as not to drop off, even when the casing 4 is removed from the track rail 6, since retainer 24 is provided for preventing dropping of the roller 7.

When roller 7 rolling in load track 2 comes off the load track 2, it enters the no load zone, and for short while, as shown by 7a of FIG. 4, is guided by direction changing path end portion 12a which is that portion of the direction changing path 12 lacking the outer corner of the square shaped section direction changing path. Then, as shown by 7b, roller 7 completely rolls into the direction changing path 12, whereby direction change is made, and is guided up to return hole 1.

As regards the side plate 26 in which said direction changing path is formed, in order to simplify the forming operation of the direction changing path 12, although various construction can be thought of, in the embodiment shown in FIGS. 5 through 12, the side plate 26 is divided into two members of upper side plate 30 and lower side plate 31 at approximately the center plane of the direction changing path. As shown in FIG. 8, the division between upper side plate 30 and lower side plate 31 is made by a plane perpendicular to said perpendicular bisector 15b and connecting outer end vertex 32 of roller 7 rolling in load track 2 and outer end vertex 33 of roller 7 rolling in return hole 1. By dividing into upper side plate 30 and lower side plate 31 as described, the direction changing path 12 is divided into upper changing path 34 formed in the upper side plate 30 and lower changing path formed in the lower side plate 31. Said upper and lower changing paths can be formed at low cost and at high accuracy by a turning operation, each being a cylindrical surface of revolution with the perpendicular bisector 15b being its axis of revolution, respectively.

The joining of said upper plate 30 and lower plate 31 can be made by fastening with bolt in a direction parallel to said perpendicular bisector 15b. The positioning of both side plates 30, 31 can be made, for instance, by a fit between conical recess 36 provided on upper side plate 30 and being concentric with upper changing path 34 and conical projection 37 provided on lower side plate 31 and being concentric with lower changing path 35. Thus, the positioning and fixing between the upper and lower side plates 30, 31 can be securely made.

It is also possible to form said upper side plate 30 and lower side plate 31 in one piece such as by injection molding, die casting, etc. Of course, means of other divided fit and joining are also possible.

Said retainer 24 is formed in a plate-like body as shown in FIGS. 13 through 15. It is provided with guide groove 38 of knife edge shape and side plate fitting holes 39, and is screw fastened to side plate 26 at its both ends, respectively. As described previously, the retainer 24 prevents dropping of rollers 7 in the load track when casing 4 is removed from track rail 6.

In a second embodiment of the present invention, as shown in FIG. 3, if $\theta=22.5°$, as shown by return hole 1c, the upper and lower surfaces of said return hole 1c will be positioned horizontally and left and right surfaces will be positioned vertically.

Accordingly, as shown in FIG. 16, return hole 1 can be formed in position 1c. In this case, since the return hole is in a no load zone and does not require to have especially high strength, it is not necessary to provide a hole, which is difficult to machine, at the inside of depending portion 5 of casing 4, and as shown in FIG. 17, a separate thin plate return body 53 can be used to be fixed on the depending portion 5 for forming return hole 1c, or, as shown in FIG. 18, the return hole can be made with an easy to machine return groove 54 on the depending portion 5 utilizing one side of the bearing plate 20. Thus, it is possible to form return hole 1c with low cost and higher accuracy.

In a third embodiment, as shown in FIG. 19, it is suitable for such case as bed of machine tools where the width is large and thus the distance between the right and left circulating paths of the rollers is large. As can be seen from FIG. 19, casing 55 is made separately for left and right sides, and each casing 55 is made so that it can be installed at the spaced left and right ends of moving member 56, thus giving freedom of selection in regard to the direction of width. In this case also, the relationship of load track 2, return hole 1, and direction changing path 12 forming the respective circulating path is exactly same.

In a fourth embodiment, as shown in FIG. 20, return hole 1 is formed inside of bearing plate 20a. In this case also, the forming of the circulating path consisting of load track 2, return hole 1, and direction changing path is exactly same.

As shown in FIG. 22, said load track 2 and return hole 1 are formed in a symmetrical position with respect to the perpendicular bisector 15b. The direction changing path 12 is formed, as shown in FIGS. 22 and 23, with a cylindrical surface of revolution which is encompassed by conical surfaces 59, 60, 61, 62 which are respectively parallel to a conical surface obtained by revolving lines, formed by connecting points 57, 58 (both points lie on said perpendicular bisector 15b), which are respectively the intersections of the perpendicular bisectors of the respective sides of load track 2 and return holes 1, with the respective centers 13, 14, about the perpendicular bisector 15b, which being its axis.

As regards the rollers 7 rolling in the direction changing path 12, if viewed from the intersection 57 or 58 on said perpendicular bisector 15b shown in FIG. 22, the shape thereof can be seen as shown in FIG. 21.

As described previously, in the case when the return hole 1, which is a no load zone, is formed directly below the preload bolt 16 in the depending portion 5 of the casing 4, the travelling length of the center of roller 7 inside the direction changing path from the load track 2 to the return hole 1 will be $\pi r/2$, if the center distance between the load track 2 and the return hole 1 is assumed to be r, as shown in FIG. 3. If $\theta$ for the return hole 1 is increased and if the return hole 1 is to be positioned approximately at the center of the width of the depending portion 5, as $\theta$ increases, r increases. Thus, since the depending portion 5 is ordinarily possible to be extended downwards, it is possible to make the travelling length $\pi r$ of the roller 7 inside the direction changing path 12 large. This produces smoother direction change of the roller inside the direction changing path 12. Also by utilizing the space B shown in FIG. 3, it is possible to form bearing plate fastening screw 23, casing mounting hole, or grease hole therein, as shown in FIG. 1. As a result, it is possible to make the width of the bearing extremely compact.

The previously described construction of load track, return hole, and direction changing path can also be utilized on roller bearing for endless linear motion having upper and lower load tracks at one side of the track rail or a total of four load tracks on both sides of the track rail, and also can be utilized in case of providing a return hole above the preload device. In case of using same roller and same track rail, in comparison with prior, for the same load capacity, with the present invention it became possible to produce a roller bearing for endless linear motion which is 10-20% more compact.

The present invention has a construction which is as described in the claim. The circulating path of the rollers of the roller bearing for linear motion comprises two linear ways, namely, load track, and return hole which is parallel to said load track and which does not have its center on the bisecting plane of V groove of said load track, and direction changing path which is a cylindrical surface of revolution of approximately square section and which is formed 180° between said two linear ways with the perpendicular bisector of the sections of said two linear ways being the axis of revolution. The return hole can be formed by keeping away from preload device consisting of preload bolt, grease hole, casing mounting hole, bearing plate fixing screw hole, etc. with the strength of the casing being sufficiently and securely retained. As a result, it is possible to minimize the dimensions of height and width as a bearing as well as the length of the casing. Also, since the respective centers of direction changing path, load track and return hole can be formed in a same plane, the direction changing path, which is a no load zone, can be made short, and at the same time the direction changing motion of the rollers can be made smoothly. As a result, it became possible to reduce the resistance of the motion of the rollers, and with increased strength as a bearing, it became unlikely for the casing to deform such as its lower portion stretching outwards due to preload or bearing load. Thus, various merits such as increased bearing life, smaller and lighter bearing for the same strength have been effected.

I claim:

1. A roller bearing for endless linear motion wherein a casing mounted on a track rail of linear shape can perform endless linear motion through a plurality of rollers which circulate endlessly, characterized in that a circulating path of the rollers comprises, two linear ways including a load track made of right angle V grooves formed on a side surface of said track rail and an inner side surface of casing opposing said side surface of said track rail and a return hole which is parallel to said load track and which does not have its center on the bisecting plane of the V groove of said load track, and a direction changing path which is of a circular arc joining both ends of said two linear ways and allowing smooth direction change motion of the rollers, said return hole having a section of approximately square shape and being symmetric to said load track with respect to the perpendicular bisector of the line segment joining the centers of the rollers rolling in said return hole and load track, said direction changing path being a cylindrical surface of revolution which is approximately square shape in section and which is formed by revolving 180° between said load track and return hole with said perpendicular bisector being the axis of revolution.

2. The roller bearing of claim 1 wherein the axis of said return hole is displaced vertically downward from said bisecting plane.

3. The roller bearing of claim 2 wherein the plane of said load track and said return hole is displaced from the horizontal by an angle between ten and thirty degrees.

4. The roller bearing of claim 3 wherein said return hole is formed by a C-shaped element and a surface of said casing.

5. The roller bearing of claim 3 wherein said return hole is formed by a surface of said casing and an element having a groove therein.

6. The roller bearing of claim 1 wherein said return hole is formed by a C-shaped element and a surface of said casing.

7. The roller bearing of claim 1 wherein said return hole is formed by a surface of said casing and an element having a groove therein.

* * * * *